March 31, 1953  C. S. PALKOWSKI  2,633,165
BORING MACHINE
Filed May 10, 1952  2 SHEETS—SHEET 1
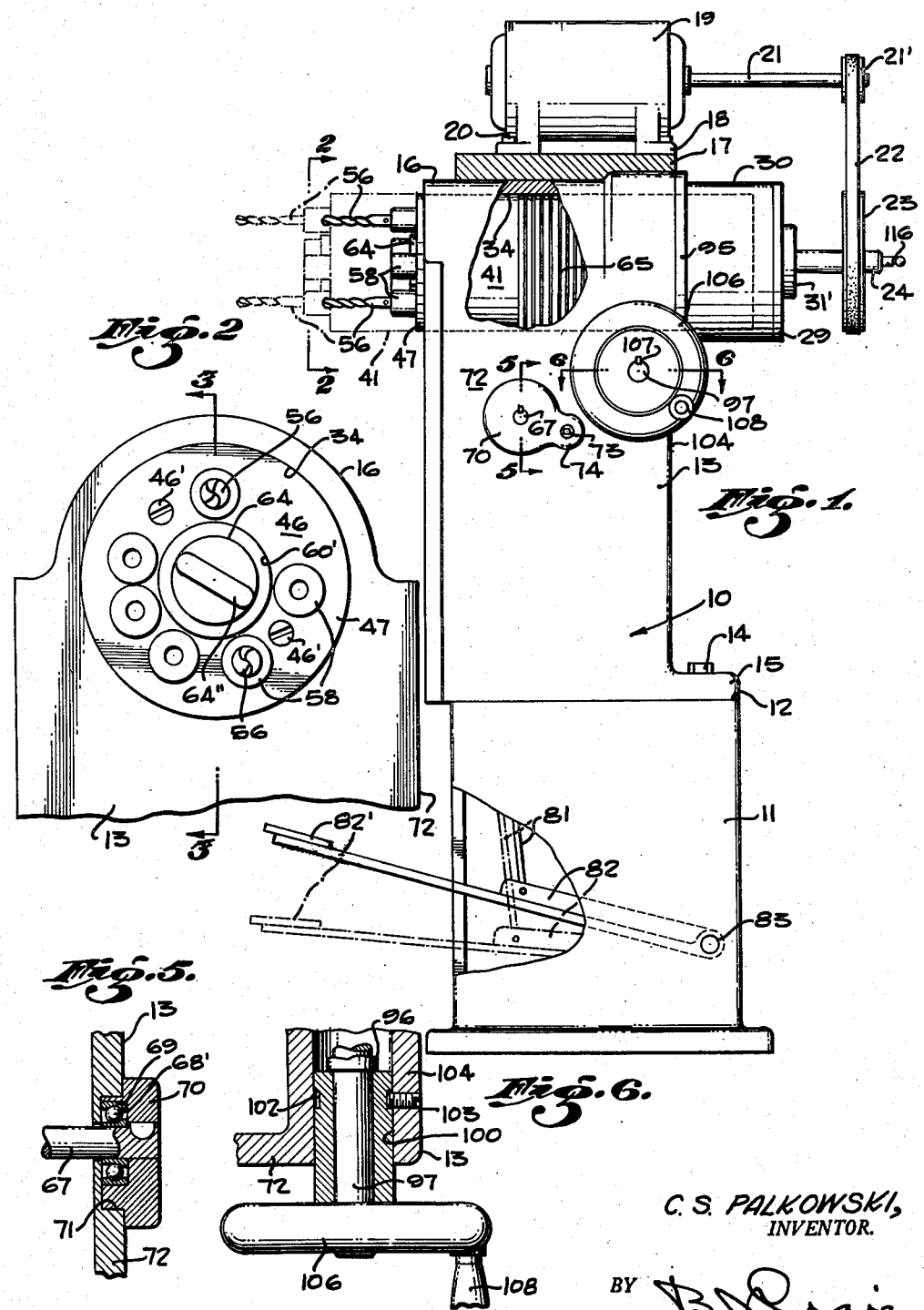
C. S. PALKOWSKI,
INVENTOR.
BY
ATTORNEY March 31, 1953 — C. S. PALKOWSKI — 2,633,165
BORING MACHINE
Filed May 10, 1952 — 2 SHEETS—SHEET 2
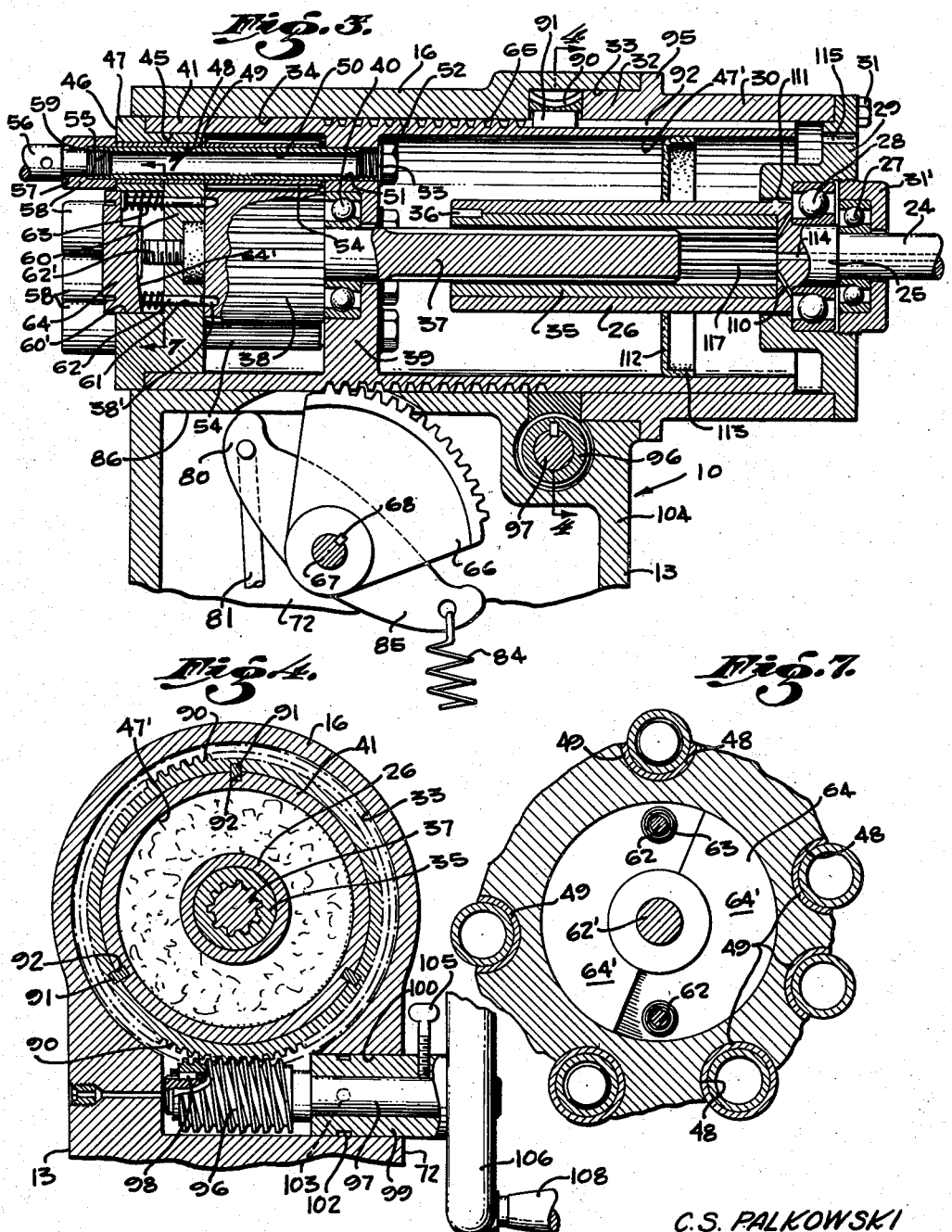
C. S. PALKOWSKI
INVENTOR.
BY
ATTORNEY Patented Mar. 31, 1953

2,633,165

UNITED STATES PATENT OFFICE 2,633,165

BORING MACHINE

Constante S. Palkowski, Huntington Park, Calif.

Application May 10, 1952, Serial No. 287,175

12 Claims. (Cl. 144—110)

1

This invention relates to a boring machine.

The general object of the invention is to provide an improved boring machine which is particularly adapted for wood boring and whereby one or more holes may be drilled accurately and efficiently.

A more specific object of my invention is to provide a boring machine which includes a novel head member.

A further object of the invention is to provide a boring machine which includes a head member and wherein novel means is provided for adjusting and moving the head member.

Another object of the invention is to provide a boring machine which includes a rotatable and axially moveable head member and wherein novel means is provided for lubricating the working parts.

A further object of the invention is to provide a boring machine including a rotatable head member having a plurality of spaced chucks therein and wherein novel means is provided for holding the head member against rotation so that drills may be readily inserted into the chucks.

Other objects and the advantages of my invention will be apparent from the following description taken in connection with the accompanying drawing, wherein:

Fig. 1 is a side elevation with parts in section and with parts broken away showing my improved boring machine;

Fig. 2 is a section taken on line 2—2, Fig. 1;

Fig. 3 is a section taken on line 3—3, Fig. 2;

Fig. 4 is a section taken on line 4—4, Fig. 3;

Fig. 5 is a section taken on line 5—5, Fig. 1;

Fig. 6 is a section taken on line 6—6, Fig. 1; and

Fig. 7 is a section taken on line 7—7, Fig. 3.

Referring to the drawing by reference characters, I have shown my invention as embodied in a boring machine which is indicated generally at 10. As shown the boring machine includes a base 11 having an upper surface 12 on which the body 13 of the boring machine is mounted and is held in place by bolts 14, which pass through a flange 15 on the body.

The body includes an upper rounded surface 16 on which I arrange a motor base 17 which may be held in place by screws 18. The motor 19 is secured to the motor base 17 by screws 20 and includes a drive shaft 21 having a V-belt pulley 21' thereon which drives a V-belt 22 which also passes over a V-belt pulley 23, which is keyed to a shaft 24.

The shaft 24 has a stepped portion 25 and has a cylindrical enlarged extension 26. The shaft

2

24 is supported by bearings 27 and 28. The bearing 28 is mounted in a cover 29 which is secured to a sleeve 30 by bolts 31. The bearing 27 is arranged in a hollow plug 31'' which is threaded to the cover 29. The plug 31'' engages the bearing 28 to hold the latter in place.

The inner end 32 of the sleeve 30 is fitted within an enlarged bore 33 in the body 13. In advance of the bore 33 the body has a cylindrical reduced main bore 34.

The cylindrical portion 26 of the shaft 24 receives a cylindrical spline member 35 which is held against rotation relative to the member 26 as by a key 36.

The spline 35 receives a second spline member 37. Upon the end of the member 37 I arrange a spur gear 38 which is shown as formed on the end of the member 37. The member 37 is supported by a bearing 40 arranged in an internal flange 39 in the head member 41 which latter is mounted to slide in the bore 34. The construction is such that when the motor is operated the shaft 24 will be driven and will rotate the spline members 35 and 37 and the gear 38.

The head member 41 includes a cylindrical front chamber 45 which is closed by a front member 46 which has a flange 47 thereon. The head member 41 also includes a rear chamber 47' in which the splined members are disposed. The front member 46 is held in place by means of screws 46' (Fig. 2) which extend through the front member 46 and through the chamber 45 and engage in threaded holes in the partition 39.

The head member 41 and the front member 46 have circumferentially aligned bores 48 which are spaced radially about the axis of the head member 41 at different angular distances, as best shown in Figs. 2 and 7, so that a variety of spacings between any two of the bores 48 may be obtained.

In each of the bores 48, I arrange a bushing 49 which rotatably supports a hollow chuck 50. The chucks 50 extend beyond the front member 46 and extend inwardly to be further journaled in bores 51 in the partition 39. The chucks 50 are further retained in position by means of studs 52 and washers 53. The washers 53 engage the partition 39. Gears 54 are formed on the chucks 50 and arranged to be engaged by the gears 38, the construction being such that when the motor 19 is operated the gear 38 will be driven to drive the chucks 50 through the gears 54.

Each of the chucks 50 has its outer end threaded as at 55 for the reception of drills 56. The drills 56 are shown as provided with shoulders 57 which are adapted to engage sleeves 58. The sleeves 58 are pressed on the protruding ends of the chucks 50 and having an internal shoulder 59 which engages the outer ends of the chucks.

The front member 40 has an end closure portion 60 thereon which is provided with spaced bores 61 in which pins 62 are arranged to slide. The pins 62 are normally urged outwardly by springs 63 so that the pins push against a locking member 64. The locking member has cam surfaces 64' thereon and has an outer operating grip 64''. The locking member has a central stud 62' which threadedly engages the portion 60 so that the locking member may be rotated. The locking member fits in a recess 60'.

When the locking member 64 is rotated the pins 62 will be moved inwardly against the tension of the springs 63 by the cam surfaces 64' and will move into spaced holes 38' in the gear 38 to thus lock the gear against rotation relative to the head member. By a worm construction to be later described, the head member cannot be rotated without turning the worm and the construction is such that when the pins 61 are moved inwardly the chucks will be held against rotation so that drills may be readily mounted and dismounted.

In order to move the head member 36 in the body bore 34 the head member is provided with a cylindrical rack 65 which extends entirely therearound and which is engaged by segmental gear 66 keyed to a shaft 67 by a key 68. When the segmental gear 66 is rocked anti-clockwise (in Fig. 3) it will move the head 36 forwardly in the bore of the body 13 to thus move the chucks and tool holders 54 towards the work.

The shaft 67, as shown in Fig. 5, is mounted in bearings 68' which are supported in holes 69 in support blocks 70. The support blocks 70 are eccentrically mounted in holes 71 in the sides 72 of the support and the construction is such that by rotating the members 70 the eccentric arrangement will move the axis about which the segmental gear turns towards and from the rack 65. The member 70 includes an arm 74 (Fig. 1) which receives a fastening member 73 which may be in the nature of a set screw and serves to hold the member 70 in adjusted position.

Shaft 67 also carries a wing 80 from which a link member 81 extends to a treadle 82 which is pivoted at 83 and when the treadle is depressed the segmental gear will be moved anti-clockwise. A spring 84 engages a second wing 85 integral with the wing 80 and normally pulls the segmental gear to the position shown in Fig. 3. The wings 80 and 85 engage the lower face of the top 86 of the base to limit movement of the gear 66 in either direction.

From the foregoing description it will be apparent that when the foot piece 82' on the treadle 82 is depressed the link 81 will rock the shaft 67 and the segmental gear 66 and the gear 66 engaging the rack 65 will move the rack 65 to the left in Fig. 3 thus moving the chucks 50 and the drills 56 to the left in Fig. 3 towards the work.

In order to rotate the head member 41 so that the chuck members will be properly positioned for their intended work I mount upon the head member a worm wheel 90 which is secured against rotation upon the head member by keys 91 disposed in slots 92. The worm wheel 90 is disposed within the bore 33 in the body 13 and it is engaged by the end portion 32 of the sleeve 30. A flange 95 engages the end of the body to limit movement of the sleeve 30.

The worm wheel 90 is engaged by a worm 96 which is mounted on a shaft 97 and is secured in place on the shaft by a set screw 98. The shaft 97 is arranged in a bushing 99 which passes through a hole 100 in the side frame 72. The bushing 99 is provided with a peripheral groove 102 which is engaged by a set screw 103. The set screw engages in the portion 104 of the body 13.

The bushing 99 is also provided with a thumb screw 105 which permits the bushing, when the set screw 103 is released, to be turned. The thumb screw 105 also serves to lock the shaft 97 against rotation when the set screw 103 engages the bushing 99. The shaft 97 is provided with a hand wheel 106 which is held in place by a key 107. The hand wheel includes a handle 108. The bushing 99 is arranged eccentric with respect to the axis of the shaft 97 so that when the set screw 103 is released the bushing may be turned by the thumb screw 105 to shift the worm towards or from the worm wheel.

In order to provide for lubrication of the bearings 27 and 28 I provide holes 110 which extend from the interior of the cylindrical extension 26 to the bearing 28 from which a passage 111 extends to the interior of the chamber 47' in which I arrange a leather cup 112 which has a peripheral flange 113 frictionally engaging the inner wall of the chamber 47'. The shaft 24 has a central bore 114 through which lubricant passes to the interior of the spline parts thence to the holes 110 whence it passes through the holes 111 into the chamber 115. A vent hole 116 in the cover 29 is provided. The shaft hole 114 is closed by a fitting 116 (Fig. 1) through which lubricant is forced. When the member 37 reciprocates it pumps lubricant into and out of the chamber 117, thus lubricating the bearings 27 and 28.

Having thus described my invention, I claim:

1. In a boring machine a body having a cylindrical transverse bore, a drive shaft in the bore, means supporting said shaft, a head member, means to mount said head member to slide and to rotate in the bore, a gear mounted in the head member, spline means driven by said shaft for driving said gear, a plurality of chucks rotatably carried by said head member, a gear connected to each of said chucks, said chuck gears meshing with said first gear, a circumferential rack on said head member, a gear pivoted on the body and engaging said rack, means for rocking said last mentioned gear to advance the head member towards a work piece, a worm wheel slidably keyed to said head member and disposed in the body bore, a worm engaging said worm wheel, a shaft mounted on said body and supporting said worm, and means to rotate said worm shaft.

2. In a boring machine a body having a cylindrical transverse bore, a drive shaft in the bore, means supporting said shaft, a head member, means to mount said head member to slide and to rotate in the bore, a gear mounted in the head member, spline means driven by said shaft for driving said gear, a plurality of chucks rotatably carried by said head member, a gear connected to each of said chucks, said chuck gears meshing with said first gear, a circumferential rack on said head member, a segmental gear, means including an eccentrically adjustable shaft for mounting the segmental gear, said segmental gear engaging said rack, means for rocking said segmental gear to advance the head member towards a work piece, a worm wheel slidably keyed to said head member and disposed in the body bore, a worm, means including an eccentrically adjustable shaft for mounting said worm on the body, said worm engaging said worm wheel, and means to rotate said worm shaft.

3. In a boring machine a body having a cylindrical transverse bore, a sleeve in the bore, a closure for the outer end of the sleeve, a shaft supported by said closure, means for driving said shaft, a spline member keyed to said shaft, a second spline member slidably engaging said first spline member, a gear on said second spline member, a head member, means on the head member supporting said second spline member, said head member being slidable and rotatable in the bore, a plurality of chucks rotatably carried by said head member, a gear connected to each of said chucks, said chuck gears meshing with said first gear, a circumferential rack on said head member, a segmental gear pivoted on the body and engaging said rack, means to limit movement of said segmental gear in each direction, means for rocking said segmental gear to advance the head member towards the work piece, a worm wheel slidably keyed to said head member and disposed at one end portion of the body bore, a worm engaging said worm wheel, a shaft mounted on said body and supporting said worm, and means to rotate said worm shaft.

4. In a boring machine, a body having a cylindrical transverse bore, a hollow head member slidable and rotatable in the bore, a plurality of chucks rotatably carried by said head member, a gear on each chuck, a gear in the head member meshing with said chuck gears, means including a splined shaft for driving said head member gear, means to advance the head member towards a work piece, means including meshing gears on the head member and on the body adapted to rotate the head member to adjusted position and to hold the head member in adjusted position, an end closure on said hollow head member, spaced slidable pins carried by said head member closure, means normally urging said pins outwardly in the head member, said head member gear having spaced holes adapted to receive said pins, a cam member threaded in said head member and having cams thereon engaging said pins and adapted to move said pins into said head member gear holes when the cam member is rotated to thereby lock the head member gear and chuck gears against rotation relative to the head member.

5. In a boring machine, a body having a cylindrical transverse bore, a hollow head member slidable and rotatable in the bore, a plurality of chucks rotatably carried by said head member, a gear on each chuck, a gear in the head member meshing with said chuck gears, means including a splined shaft for driving said head member gear, means to advance the head member towards a work piece, a worm wheel slidably keyed to said head member and disposed in the body bore, a worm engaging said worm wheel, a shaft mounted on said body and supporting said worm, means to rotate said worm wheel shaft, said worm and worm wheel holding the head member against rotation except when the work is rotated, a closure secured to the outer end of said hollow head member, and manually operated means including a cam member adapted to lock the head member gear and chuck gears against rotation relative to the head member.

6. In a boring machine, a body having a cylindrical transverse bore, a hollow head member slidable and rotatable in the bore, a plurality of chucks rotatably carried by said head member, a gear on each chuck, a gear in the head member meshing with said chuck gears, means including a splined shaft for driving said head member gear, means to advance the head member towards a work piece, a worm wheel slidably keyed to said head member and disposed in the body bore, a worm engaging said worm wheel, a shaft mounted on said body and supporting said worm, means to rotate said worm wheel shaft, said worm and worm wheel holding the head member against rotation except when the worm is rotated, a closure secured to the outer end of said hollow head member, spaced slidable pins carried by said head member closure, means normally urging said pins towards the head member gear, said head member gear having spaced holes adapted to receive said pins, a cam member threaded in said head member and having cams thereon engaging said pins and adapted to move said pins into said head member gear holes when the cam member is rotated to thereby lock the head member gear and chuck gears against rotation relative to the head member.

7. In a boring machine, a body having a cylindrical transverse bore, a sleeve in one end of the bore, a closure for one end of said sleeve, said closure having a hole therein, a flange partially closing said hole, a bearing in said hole and engaging said flange, means to hold the bearing in place, a shaft rotatably supported by said bearing, said shaft having a cylindrical portion thereon, a hollow spline member carried by said cylindrical portion, a spline shaft slidable in said hollow spline member and driven by said hollow spline member, a head member slidable in said bore, chucks carried by said head member, a gear for each chuck, a gear on said spline shaft engaging said chuck gears, and means to reciprocate said head member, said shaft having a hole extending therethrough and into said cylindrical portion, said cylindrical portion having holes therethrough and directed towards said first bearing, said closure having a vent therein.

8. In a boring machine, a body having a cylindrical transverse main bore, said bore including an enlarged end portion, a sleeve in the enlarged end portion, a closure for one end of said sleeve, said closure having a hole therein, a flange partially closing said hole, a bearing in said hole and engaging said flange, a second bearing engaging said first bearing, said hole including a threaded portion, an apertured plug, threadedly engaging said threaded hole portion and said second bearing to hold the bearings in place, a shaft rotatably supported by said bearings and extending through said plug, said shaft having a cylindrical portion thereon, a hollow spline member carried by said cylindrical portion, a spline shaft slidable in said hollow spline member and driven by said hollow spline member, a head member slidable in said main bore, chucks carried by said head member, a gear for each chuck, a gear on said spline shaft engaging said chuck gears, means to reciprocate said head member, said shaft having a hole extending therethrough and into said cylindrical portion, and means closing the outer end of said shaft hole, said cylindrical portion having holes therethrough and directed towards said first bearing, said closure having a vent therein.

9. In a boring machine a body having a cylindrical transverse bore, a sleeve in the bore, a closure for the outer end of the sleeve, a bearing supported by said closure, a shaft supported by said bearing, means for driving said shaft, said shaft having a cylindrical portion disposed in said body bore, a spline member keyed to said cylindrical portion, a second spline member slidably engaging said first spline member, a spur gear on said second spline member, a head member supporting said spur gear, said head member being slidable and rotatable in the main bore, a plurality of chucks rotatably carried by said head member, a gear connected to each of said chucks, said chuck gears meshing with said spur gear, a circular rack on said head member, a segmental gear engaging said rack, means to mount said segmental gear for rocking movement on said body, means to limit the movement of said segmental gear in each direction, means for rocking said segmental gear to advance the head member towards the work piece, said head member having a reduced portion in the rear of said rack, a worm wheel slidably keyed to said head member reduced portion and disposed in the enlarged inner end portion of the body bore, a worm wheel engaging said worm, a shaft supporting said worm wheel, a bushing, means to support said bushing on said body, said bushing receiving said worm wheel shaft, and means to rotate said worm wheel shaft.

10. In a boring machine a body having a cylindrical transverse main bore, a sleeve in the bore, a closure for the outer end of the sleeve, bearings supported by said closure, a shaft supported by said bearings, means for driving said shaft, said shaft having a cylindrical portion disposed in said body bore, a spline member keyed to said cylindrical portion, a second spline member slidably engaging said first spline member, a spur gear on said second spline member, a head member slidable and rotatable in the bore, a plurality of chucks rotatably carried by said head member, a gear connected to each of said chucks, said chuck gears meshing with said first gear, a circular rack on said head member, a segmental gear engaging said rack, means to mount said segmental gear for rocking movement on said body, means to limit the movement of said segmental gear in each direction, a treadle for rocking said segmental gear to advance the head member towards the work piece, said head member having a reduced portion in the rear of said rack, a worm wheel slidably keyed to said head member reduced portion and disposed in the enlarged inner end portion of the body bore, a worm engaging said worm wheel, a shaft supporting said worm, a bushing, means to rotatably support said bushing on said body, said bushing having an eccentrically arranged hole therein, said hole receiving said worm shaft, means to rotate said bushing to vary the eccentricity of the worm shaft, means to hold said bushing in adjusted eccentric position and means to rotate said worm shaft.

11. In a boring machine, a body having a cylindrical transverse bore, a sleeve in the bore, a closure for the outer end of the sleeve, a bearing supported by said closure, a shaft supported by said bearing, means for driving said shaft, said shaft having a cylindrical portion disposed in said body bore, a spline member keyed to said cylindrical portion, a second spline member slidably engaging said first spline member, a spur gear on said second spline member, a head slidable and rotatable in the bore, a plurality of chucks rotatably carried by said head member, a gear connected to each of said chucks, said chuck gears meshing with said first gear, a circular rack on said head member, a segmental gear engaging said rack, means to mount said segmental gear for rocking movement on said body, said mounting means including an eccentrically mounted shaft, means to limit the movement of said segmental gear in each direction, a treadle for rocking said segmental gear to advance the head member towards the work piece, said head member having a reduced portion in the rear of said rack, a worm wheel slidably keyed to said head member reduced portion and disposed in the enlarged inner end portion of the body bore, a worm engaging said worm wheel, a shaft supporting said worm, a bushing, means to rotatably support said bushing on said body, said bushing having a hole therein, said hole receiving said worm shaft, and means to rotate said wheel shaft.

12. In a boring machine a body having a cylindrical transverse main bore, said bore including an enlarged inner end portion, a sleeve in the enlarged portion of the bore, a closure for the outer end of the sleeve, bearings supported by said closure, a shaft supported by said bearings, means for driving said shaft, said shaft having a cylindrical portion disposed in said body bore, a spline member keyed to said cylindrical portion, a second spline member slidably engaging said first spline member, a spur gear on said second spline member, a head member slidable and rotatable in the main bore, a plurality of chucks rotatably carried by said head member, a gear connected to each of said chucks, said chuck gears meshing with said first gear, a circular rack on said head member, a segmental gear engaging said rack, means to mount said segmental gear for rocking movement on said body, said mounting means including an eccentrically mounted shaft, means to limit the movement of said segmental gear in each direction, a treadle for rocking said segmental gear to advance the head member towards the work piece, said head member having a reduced portion in the rear of said rack, a worm wheel, slidably keyed to said head member reduced portion and disposed in the enlarged inner end portion of the body bore, a worm engaging said worm wheel, a shaft supporting said worm, a bushing, means to rotatably support said bushing on said body, said bushing having an eccentrically arranged hole therein, said hole receiving said worm shaft, means to rotate said bushing to vary the eccentricity of the worm shaft, means to hold said bushing in adjusted eccentric position and means to rotate said worm shaft.

CONSTANTE S. PALKOWSKI.

REFERENCES CITED

The following references are of record in the file of this patent:

UNITED STATES PATENTS

| Number | Name | Date |
|---|---|---|
| Re. 17,822 | Wagner | Oct. 7, 1930 |
| 1,136,031 | Mitchell | Apr. 20, 1915 |
| 1,755,401 | Koehl et al. | Apr. 22, 1930 |